Figure 1:
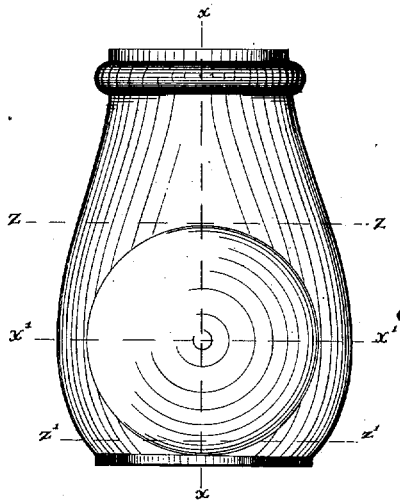

C. J. HIGGINS.

LANTERN GLOBE AND REFLECTOR.

No. 10,814. Reissued Mar. 8, 1887.

Attest,
G. W. H. Brown,
Frank Brawner.

Inventor:
Charles J. Higgins
per A. P. Steward atty.

N. PETERS, Photo-Lithographer, Washington, D. C.

UNITED STATES PATENT OFFICE.

CHARLES J. HIGGINS, OF HALLOWELL, MAINE.

LANTERN GLOBE AND REFLECTOR.

SPECIFICATION forming part of Reissued Letters Patent No. 10,814, dated March 8, 1887.

Original No. 349,219, dated September 14, 1886. Application for reissue filed December 15, 1886. Serial No. 221,675.

*To all whom it may concern:*

Be it known that I, CHARLES J. HIGGINS, a citizen of the United States, residing at Hallowell, in the county of Kennebec and State of Maine, have invented certain new and useful Improvements in Lantern-Globes; and I do hereby declare the following to be a full, clear, and exact description of the invention, such as will enable others skilled in the art to which it appertains to make and use the same.

Prior to my invention it has been attempted to provide a glass globe for lanterns and other illuminating bodies with a raised flat side to co-operate with a reflector; but all such attempts known to me have produced a globe liable to fracture, because of the fact, as I believe, that in the formation of the flat surface a shoulder has been left at the junction of the top of the flat side with the main body of the globe, as well as at all other points of juncture. The globe first becomes heated at the top, and the heat thence gradually travels downward, and, meeting the arch formed by the shoulder between the main body and the flattened side, causes such unequal expansion that the glass globe is quickly broken at the junction of the flattened surface with the main body.

This invention has for its object to provide a globe or chimney having a flattened side or surface with a reflector so constructed as to throw the rays of light at an angle with relation to the vertical plane of the globe, the flattened side being formed, substantially as will be described, to obviate breakage of the globe because of unequal expansion and contraction of the glass.

In accordance with this invention the glass globe is formed with a flattened side or surface, preferably circular in form, it having, however, a shoulder at its junction with the main body for but a portion of its circumference, preferably the junction of the upper portion of the flattened side with the main body of the globe being without a shoulder; or, in other words, the junction of the top of the flattened side with the main body of the globe is without a shoulder or sharp angle of any kind, thus permitting the necessary expansion without liability of fracture.

The reflector herein shown consists of a concave plate polished interiorly to present a suitable reflecting-surface and having a flange of varying depth, the flange of the reflector snugly fitting or embracing the segmental shoulder formed at the junction of the flattened side with the main body, the varying depth of the flange causing the reflector to lie at an angle to the surface of the globe, to thereby divert the rays of light at an angle, and in this instance downward. The edge of the flange is turned outward, so that when placed in position to embrace the shoulder the cementitious material, employed to unite and thereby rigidly connect the reflector with the globe may be placed between such outwardly-turned portion or lip of the flange and the shoulder.

Figure 2:
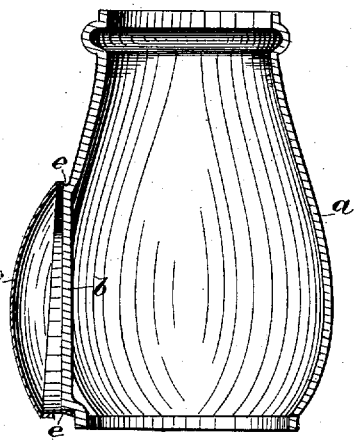
Figure 3:
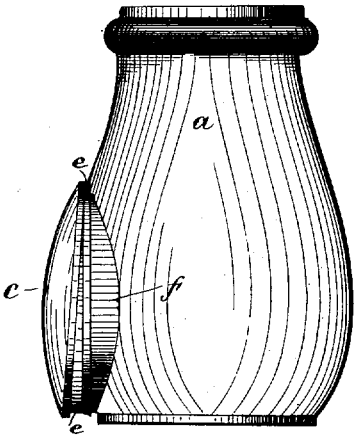
Figure 4:
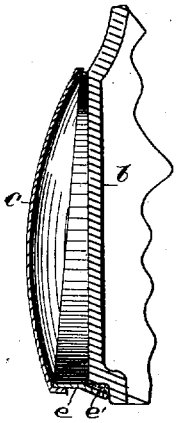

Figure 1 shows in front elevation a globe embodying this invention, the reflector being removed; Fig. 2, a vertical section of Fig. 1, taken on the line *x x*, the reflector being placed in position; Fig. 3, a right-hand side elevation of Fig. 1, the reflector being applied; Fig. 4, an enlarged vertical section of a portion of Fig. 2.

The globe or chimney *a* is herein shown of suitable shape to be applied to a lantern of ordinary construction. One side of the globe *a* is formed with a flattened side, *b*, preferably of circular form and having a plane face. A shoulder, *f*, of varying depth, is formed at the junction of the flattened side with the main body *a* of the globe, that portion of the shoulder on the dotted line *x′ x′* having the greatest depth and tapering gradually to the line *z′ z′* at the lower end of the globe, where the shoulder is only of sufficient depth to give a holding-surface for the reflector *c*, and the said shoulder tapering upwardly from the line *x′ x′* toward the line *z z*, so that at the junction of the top portion of the flattened surface *b* and the main body of the globe no shoulder or sharp angle is presented. As previously stated, when a shoulder is formed at the junction of the main body of the globe with the top of the flattened side, the globe is liable to fracture, and as a shoulder partially surrounding the flattened surface gives sufficient holding-surface for the reflector *c*, to be described, the top portion of the flattened surface at its junction with the main body is formed without a shoulder, so that at such point a very slight deviation of the general outline or contour of the globe is presented.

The reflector *c* consists of a concaved plate or disk of circular shape, and polished interiorly to present a suitable reflecting-surface. A flange, *e*, is attached to said concaved disk *c*, which is of varying depth and of sufficient diameter to embrace the shoulder *f* of the globe. The edge of the flange *e* is spun or turned outward, as at *e'*, so that when the reflector is placed in position, with the flange thereof embracing the shoulder *f* of the globe, an upturned lip is presented, beneath which the cementitious material is placed, to thereby connect the reflector with the globe, rendering it impervious to air. In practice I have found that this method of attaching the reflector to the globe is of especial advantage, as the cementitious material is prevented from entering between the reflecting-surface *c* and the globe, or running down or otherwise defacing the reflecting-surface, to thereby destroy its efficiency.

It will be seen that by providing the reflector with the flange *e* of varying depth it may be readily placed in position to present the reflecting-surface at an angle with relation to the flattened side *b* of the above-described or any other suitable globe or chimney, to thereby divert the rays of light in any given direction.

In this instance I have shown the reflector with the deepest portion of the flange at the bottom, thereby so positioning the reflecting-surface as to divert the rays of light downward, such position being of especial advantage under ordinary circumstances.

I am aware that reflectors have been provided at their open end with an inwardly-inclined reflecting-rim for the purpose of concentrating the rays of light. I am also aware that parabolic or conical shaped reflectors have been heretofore constructed with the upper side longer than the lower and the remaining sides thereof gradually diminishing in length both ways, from the greatest to the shortest length, so that the upper side shall project over the lower and form a screen for the eyes from the light; but I hereby disclaim any such use of the flange with which my reflector is provided, its use being confined to that herein described.

I claim—

1. A glass globe having a raised side or surface formed with a shoulder but partially around it, substantially as described.

2. The reflector *c*, consisting of a disk or cover provided with a reflecting-surface and with a flange of varying depth for holding it at an inclination to the surface of the globe or chimney to which it may be applied, substantially as described.

3. A glass globe having a flat side or surface formed with a shoulder at its junction with the main body, said shoulder extending around the lower portion of the flattened surface and gradually tapering off upon each side at the top, to thereby leave the junction of the top of the flattened surface with the main body of the globe without a shoulder or other sharp bend or angle, substantially as described.

4. A globe or chimney having a flattened side, *b*, and a shoulder, *f*, of varying depth, joining the side *b* with the main body of the globe, combined with a reflecting-disk having a flange of varying depth for connecting the said reflecting-disk with the globe, whereby the said disk is retained at an angle with relation to the said flattened side *b* of the globe or chimney, substantially as described.

5. A globe or chimney having a raised side and surrounded partially by a flange, the upper part of the raised surface meeting the main body of the globe without a flange or abrupt shoulder, combined with a reflector attached to the said projection, substantially as described.

6. A globe or chimney having a flattened side, *b*, and a shoulder, *f*, of varying depth, combined with a reflector having a flange to embrace the said shoulder, the edge of the said flange being turned outward to form a lip to permit cementitious material to be inserted between the said lip and the shoulder, substantially as described.

7. The combination, with a globe or chimney, of a reflector consisting of a disk provided with a reflecting-surface, and with a flange substantially at right angles to said disk, said flange being of varying depth, for holding it at an inclination to the surface of the globe or chimney to which it may be applied, substantially as described.

In testimony whereof I have signed my name to this specification in the presence of two subscribing witnesses.

CHARLES J. HIGGINS.

Witnesses:
J. Q. A. SHAW,
GEO. F. THOMPSON.